(12) United States Patent
Grapov et al.

(10) Patent No.: US 7,526,162 B1
(45) Date of Patent: Apr. 28, 2009

(54) COLLIMATOR

(75) Inventors: Yuri Grapov, Sutton, MA (US); William D. Jones, Wrentham, MA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 12/072,598

(22) Filed: Feb. 27, 2008

(51) Int. Cl.
*G02B 6/26* (2006.01)

(52) U.S. Cl. .............. 385/52; 385/60; 385/72; 385/77; 385/78; 385/81; 385/93

(58) Field of Classification Search .......... 385/52, 385/53, 56, 60, 62, 66, 70, 72, 76, 77, 78, 385/79, 81, 85, 139, 31, 33, 34, 92, 93
See application file for complete search history.

(56) References Cited

U.S. PATENT DOCUMENTS

| 4,679,895 | A | * | 7/1987 | Huber | 385/87 |
| 4,696,538 | A | * | 9/1987 | Despouys | 385/78 |
| 4,753,510 | A | * | 6/1988 | Sezerman | 385/61 |
| 4,767,177 | A | * | 8/1988 | Cartier | 385/81 |
| 4,889,406 | A | * | 12/1989 | Sezerman | 385/35 |
| 5,642,448 | A | | 6/1997 | Pan | 385/31 |
| 5,822,478 | A | | 10/1998 | Kim | 385/33 |
| 5,841,591 | A | | 11/1998 | Zhu | 385/81 |
| 6,168,319 | B1 | | 1/2001 | Francis | 385/79 |
| 2002/0126966 | A1 | * | 9/2002 | Hirsch | 385/95 |

* cited by examiner

*Primary Examiner*—Brian M Healy

(57) ABSTRACT

An epoxy-free collimator assembly is configured with a ferrule and a lens operative to move within an outer case to a desired position therebetween. The collimator assembly further has an aligning component made from soft, malleable material which is capable of filling out the radial space between the ferrule and case so as to spatially fix the aligned fiber held in the ferrule and lens in the desirable position.

7 Claims, 2 Drawing Sheets

COLLIMATOR

BACKGROUND OF THE INVENTION

1. Field of the Invention

The present invention relates generally to laser optical components, and in particular to fiber collimators.

2. Technical Background

The light transmitted through the fiber interacts with a variety of optical elements, such as, among others, modulators, splits, and combiners. In most cases at least one fiber is led into an enclosure operating as an optical system. The input light interacts with one or more optical devices within the enclosure, and the resulting light exits the enclosure and may be coupled to a single or multiple output fibers.

In practice, the fibers used in such optical systems are typically held in collimator assemblies which are aligned to the enclosure of the optical system. FIG. 1 illustrates a typical collimator assembly 10 including as its most fundamental components housing or outer case 12, a fiber 14, a small glass tube or ferrule 18 which holds the exposed fiber end, and a graded-index lens (GRIN) lens 20.

The assembly and alignment of the conventional collimator assembly involve time-consuming and labor-intensive operations. The spatial position between ferrule 18 with fiber 14 held in the ferrule and lens 20 may be of a particular concern during the use of the assembled collimator since it often experiences external impacts easily misaligning these components. To provide collimator assembly 10 with additional robustness, a conventional collimator may have inner sleeves 16 and 22 machined from outgassing metals or ceramics and configured to hold ferrule 18 and lens 20 in the desired fixed spatial relationship. In addition, once the distance between collimator has been set, the entire assembly is treated with epoxy.

The use of outgassing materials may be critically damaging to the assembled collimator due to prohibitively elevated temperatures as well known to one of ordinary skills in the art of lasers. Furthermore, manufacturing of additional parts, such as at least one inner sleeve, adds to the already cost-ineffective and time-consuming process of the manufacturing of collimator assemblies.

It is, therefore, desirable to provide a robust, thermally stable and cost-effective structure of a collimator assembly.

SUMMARY OF THE INVENTION

This objective is attained by the disclosed collimator assembly. The collimator assembly has a case centered on a longitudinal axis, a ferrule unit holding a fiber and mounted concentrically to the case, a lens mounted to the case and juxtaposed with a distal end of the fiber, and a soft, malleable and easily fusible aligning element. The aligning element provides for a relatively labor-relaxed and cost-effective manufacturing process and reliably fix the fiber and lens in the desired spatial position.

In accordance with one aspect of the disclosure, the aligning element is configured to fill up the interstices between the ferrule assembly and outer case and reliably seal the ferrule assembly in a fixed spatial position relative to the lens. After the sealing material is solidified, the entire collimator assembly can withstand the most severe environmental conditions and preserve its integrity including the reliable alignment between the fiber and lens. The aligning element is made from materials that do not exhibit an outgassing effect.

According to another aspect of the disclosure, the lens, like the ferrule assembly, is coupled to the housing by means of a sealing element configured similarly to the sealing element between the outer case and ferrule unit. The use of soft, malleable and fusible material provide the entire collimator assembly with the water-resistant quality.

In accordance with a further aspect of the disclosure, the collimator assembly has a configuration allowing for a relatively easy alignment between the end of the fiber and the lens. In particular, an X-Y-Z stage fixture stage can be easily coupled to the disclosed collimator assembly so as to allow for alignment between the fiber and lens. Upon establishing the desired light spot indicative of the aligned spatial position between the fiber and lens, the fixture can be easily dismounted.

BRIEF DESCRIPTION OF THE DRAWINGS

The above and other aspects, features and advantages of the disclosed structure will become more readily apparent from the specific description of the disclosure accompanied by the following drawings, in which.

SPECIFIC DESCRIPTION

Figure 2:
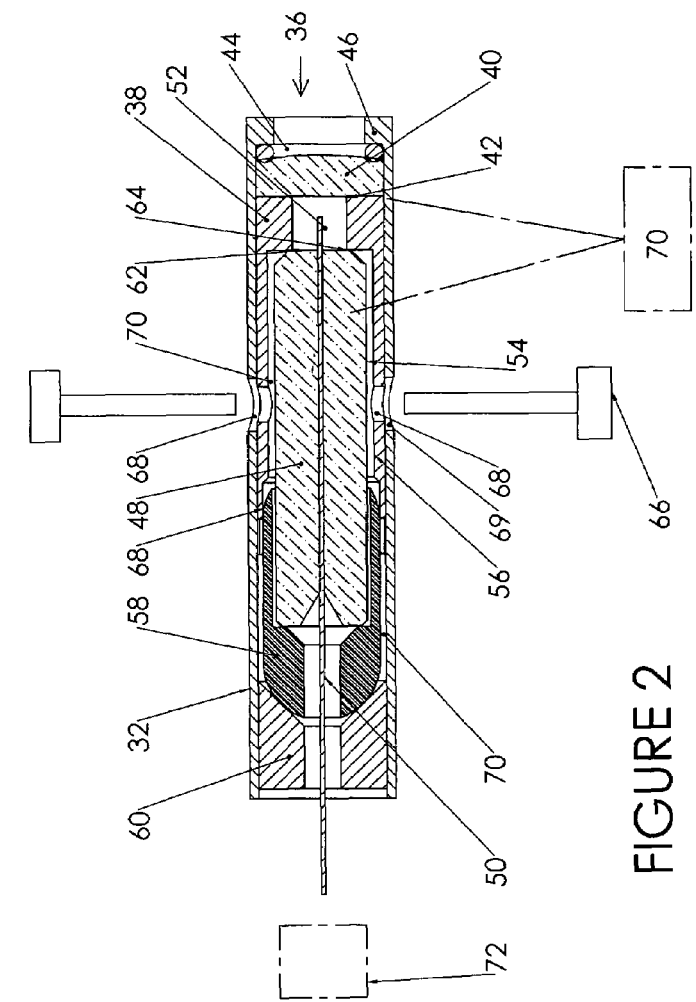
FIG. 2 is an elevated cross-sectional view of the disclosed collimator assembly.

Reference will now be made in detail to the disclosed system. Wherever possible, same or similar reference numerals are used in the drawings and the description to refer to the same or like parts or steps. The drawings are in simplified form and FIG. 2 is far from precise scale. For purposes of convenience and clarity only, the terms "connect," "couple," and similar terms with their inflectional morphemes do not necessarily denote direct and immediate connections, but also include connections through mediate elements or devices The invention allows for an easy alignment between ferrule and lens assemblies which are coupled together using soft, malleable and easily fusible material that does not exhibit the outgassing effect. The disclosed collimator assembled in accordance with this disclosure is a cost-effective and robust structure.

FIG. 2 illustrates the disclosed collimator assembly 300. The assembly 30 is configured with an elongated outer case 32 centered about a longitudinal axis which extends between proximal and distal ends 34, 36 of the case, respectively. Preferably, but not necessarily, case 32 has a cylindrically shaped cross-section. An inner sleeve 38 is concentrically mounted inside case 32 and has outer surfaces in continuous radial contact with the inner surface of case 32.

A lens 40 is configured with a proximal side 42 which presses axially against the distal end of inner sleeve 38, while the peripheral surface of lens 40 is radially tight pressed against the inner surface of housing 32 upon mounting lens 40 through distal end 36 of case 32. The lens 40 is configured as a graded-index lens (GRIN) lens which is a generally cylindrically shaped piece of optical glass. It is fabricated to have a radially varying index of refraction that is greater towards the center, with the result being that it produces a focusing effect similar to a convex lens. Sealing of the inner structure of assembly on distal end 36 of case 32 is realized by a sealing ring 44 which is received in a radial seat defined between an L-shaped flange 46 of the distal region of case 32 and the distal face of lens 40.

Figure 1:
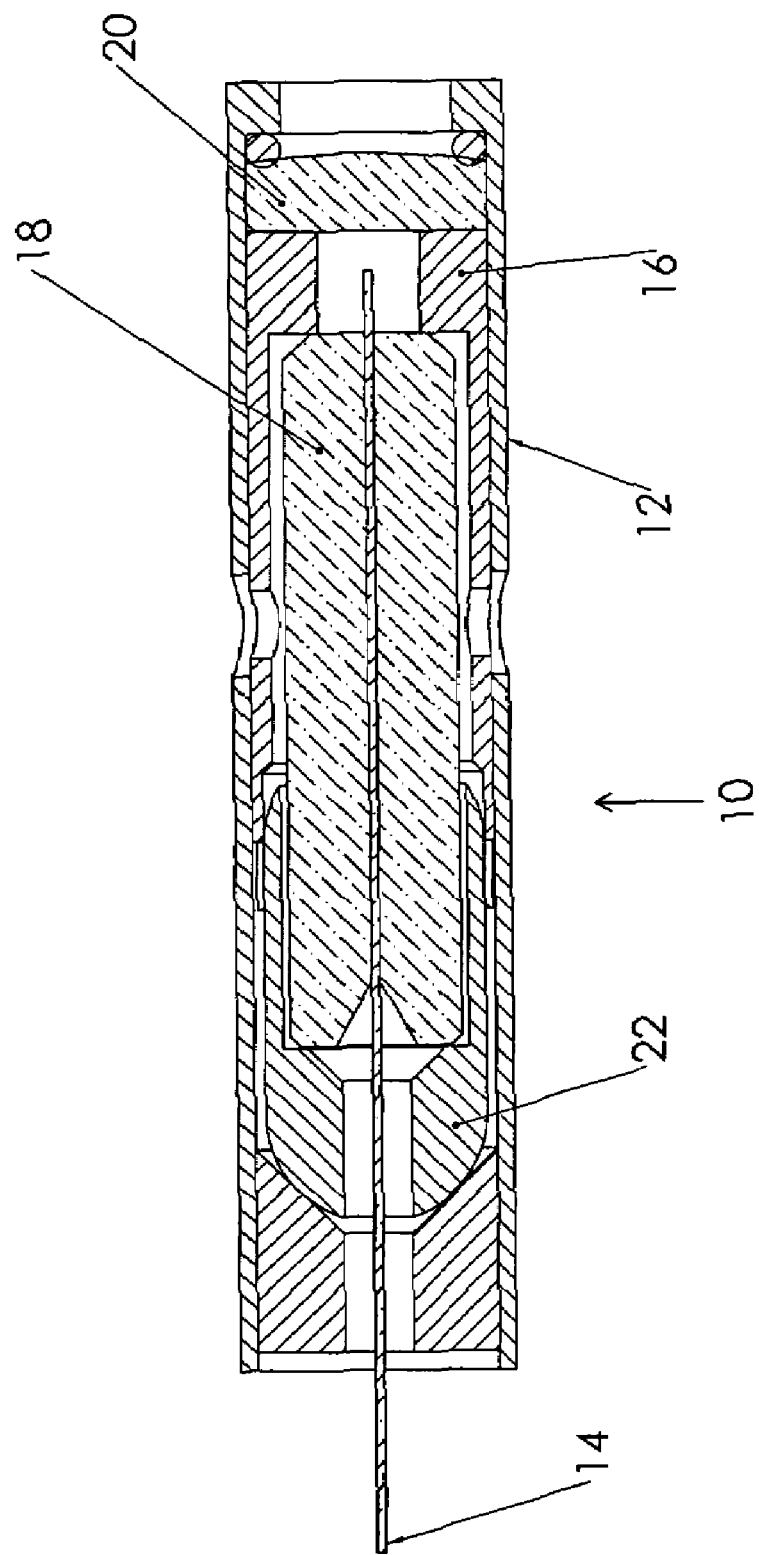
FIG. 1 is an elevated axial cross-sectional view of a conventional collimator assembly.
Figure 3:
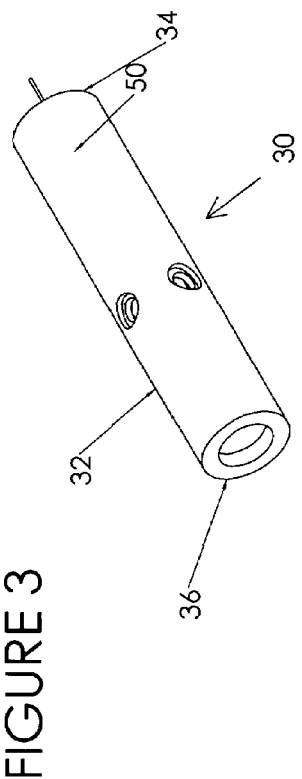
FIG. 3 is a perspective view of the disclosed assembly of FIG. 2 shown in its actual size.

A ferrule 48 holding a fiber 50 is axially slid through proximal end 34 (FIG. 3) of case 32 and has a distal free end 52 of fiber 50 projecting beyond the ferrule towards lens 40. The ferrule 48 is shaped and dimensioned to have a loose tolerance between its peripheral surface 54 and an inner peripheral surface 56 of sleeve 38. A distal frustoconical end 62 of ferrule 48 axially urges against an inner face 64 of inner sleeve 38.

The dimensions of ferrule 48 are selected so as to allow for X-Y-Z displacement of the ferrule within inner sleeve 38, as will be disclosed hereinbelow. Displacement of ferrule 48 is necessary to align distal end 52 of fiber 50 with lens 40. The light, propagating along fiber 50 and diverging from its distal end 52, is collimated by lens 40 to assume the desired spot size. The distal ends of respective ferrule 48 and fiber 50 are cleaved, ground, and polished at a predetermined facet angle to prevent back reflection along the optical axis.

The distance between fiber distal end 52 (as determined by the ferrule position) and lens 40 is crucial for collimation. In contrast to the known prior art, once the desired distance between fiber end 52 and lens 40 is set, fiber 50 and lens 40 are fixed within inner sleeve 38 by an aligning component 58 made from soft, malleable and easily fusible material, such as indium and its alloys, lead and its alloys. In fact, any material exhibiting softness, ductility and malleability at room temperatures while not exhibiting outgassing can be utilized within the scope of this disclosure.

The position of ferrule 48 relative to lens 40 may be adjusted by axially displacing ferrule 48 in a Z direction relative to lens 40 and by pivoting its distal end 62 relative to surface 64, which forms a seat for ferrule end 62, of inner sleeve 38 along X-Y axes. An alignment fixture has four angularly equidistantly spaced arms 66 (only two arms are shown) extend radially inwards through respective radially aligned openings 68 and 70 in case 32 and inner sleeve 38, respectively. The arms 66 are selectively pressed against outer peripheral surface 54 of ferrule 48 causing ferrule 48 to pivot. The various stages of the alignment fixture are manually or automatically adjusted to minimize insertion loss, which is measured by observing the magnitude of the optical signal on a detector attached to one of the fiber. Upon achieving the desired beam spot, aligning component 58 is placed within case 32 through proximal end 34 of the case and further displaced axially inwards by a plunger 60.

As component 58 is being displaced axially inwards, it spreads through radial space 58 defined between surface 54 of ferrule 48 and the opposing surface of case 32. Upon the solidification of component 58, all parts including outer case 32, inner sleeve 38, lens 40, ferrule 48 and, of course, distal end 52 of fiber 50 are in a fixed spatial relationship to provide the desired spot size of the light during the use of assembly 30. The solidified structure is robust and can withstand substantial external impacts while preserving the aligned position between fiber 50 and lens 40. Furthermore, the disclosed structure is free from a gluing material, such as epoxy.

The sealing ring 44 holding lens 40 in the desired position is also made from the same as or similar to material to that one of aligning component 58. In addition to the preserving the desired position between fiber 50 and lens 40, this material also prevents penetration of liquid from outside. Therefore, assembly 30 is well suited for underwater applications. The aligned epoxy-free collimator assembly 30 can be fabricated independently of the optical system in which they are to be used or integrally therewith. The disclosed collimator assembly 30 can have an outer diameter as small as about 4 mm.

While it is possible to perform the beam profiling manually, it is desirable to use a computerized beam profiling system 70. The beam profiling system 70 can be display on a CRT screen (not shown) one or more beam profiles having an experimentally determined beam width. In particular, system 70 is configured with a processing unit coupled to arms 66 and to the screen upon which the output beam from collimator assembly 30 is incident. The dependence of the X-Y measurements and the desired beam spot size is well understood by one of ordinary skills in the laser arts.

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention is not restricted to the particular constructions described and illustrated, but should be construed to cohere with all modifications that may fall within the scope of the appended claims.

The invention claimed is:

1. An epoxy-free collimator assembly comprising:
   a case having an inner surface;
   a focusing lens mounted within the case and being concentric therewith;
   a ferrule configured to hold a fiber and mounted within the case so that an outer periphery of ferrule and the inner surface of the case define a radial space therebetween, the ferrule being displaceable along a plurality of mutually orthogonal axes so as to establish a desirable position of the fiber relative to the lens; and
   an aligning component configured with soft and malleable material capable of filling out the radial space between the ferrule and case so as to spatially fix the ferrule in the desirable position, wherein the aligning component is water resistant and operative to seal one of opposite ends of the case.

2. The collimator assembly of claim 1, wherein the aligning component includes the group consisting of indium, lead and alloys thereof.

3. An epoxy-free collimator assembly comprising:
   a case having an inner surface;
   a focusing lens mounted within the case and being concentric therewith;
   a ferrule configured to hold a fiber and mounted within the case so that an outer periphery of ferrule and the inner surface of the case define a radial space therebetween, the ferrule being displaceable along a plurality of mutually orthogonal axes so as to establish a desirable position of the fiber relative to the lens;
   an aligning component configured with soft and malleable material capable of filling out the radial space between the ferrule and case so as to spatially fix the ferrule in the desirable position; and
   a sealing ring extending continuously radially between the focusing lens and case and configured with the soft and malleable material.

4. An epoxy-free collimator assembly comprising:
   a case having an inner surface;
   a focusing lens mounted within the case and being concentric therewith;
   a ferrule configured to hold a fiber and mounted within the case so that an outer periphery of ferrule and the inner surface of the case define a radial space therebetween, the ferrule being displaceable along a plurality of mutually orthogonal axes so as to establish a desirable position of the fiber relative to the lens;

an aligning component configured with soft and malleable material capable of filling out the radial space between the ferrule and case so as to spatially fix the ferrule in the desirable position; and an inner sleeve extending coaxially within the case and having an L-shaped flange, the flange being sandwiched between a proximal side of the focusing lens and a distal side of the ferrule, wherein the distal end of the ferrule is frustoconically shaped to provide for pivoting of the ferrule and inner sleeve relative to one another.

5. The collimator assembly of claim 1, wherein the plurality of axes includes orthogonally extending X, Y and Z axes.

6. The collimator assembly of claim 1 further comprising a plunger operative to axially move within the case in response to an external thrust while displacing the aligning component toward the lens.

7. The collimator of claim 4 further comprising:
a processing unit operative to generate a signal indicating a position of the ferrule within the case; and
a plurality of angularly spaced arms coupled to the processing unit, the arms being selectively displaceable within respective pairs of radially aligned openings so as to displace the ferrule to the desirable position in response to the signal from the processing unit.

* * * * *